(12) United States Patent
Augustin, Sr. et al.

(10) Patent No.: US 7,155,026 B2
(45) Date of Patent: Dec. 26, 2006

(54) MOUNTING BRACKET SYSTEM

(75) Inventors: Kevin C. Augustin, Sr., Greenwood, IN (US); Steven W. Hutt, Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 665 days.

(21) Appl. No.: 10/428,313

(22) Filed: May 2, 2003

(65) Prior Publication Data

US 2004/0031891 A1    Feb. 19, 2004

Related U.S. Application Data

(60) Provisional application No. 60/391,134, filed on Jun. 24, 2002, provisional application No. 60/378,188, filed on May 6, 2002, provisional application No. 60/380,001, filed on May 2, 2002.

(51) Int. Cl.
H04R 25/00    (2006.01)

(52) U.S. Cl. .................. 381/386; 381/387; 381/395; 381/431

(58) Field of Classification Search ............. 381/86, 381/87, 332–334, 386–389, 392, 395, 408, 381/431; 181/141, 150, 164, 173, 199; 248/27.1, 27.3, 342, 343, 205.1
See application file for complete search history.

(56) References Cited

U.S. PATENT DOCUMENTS

| 1,643,791 | A | | 9/1927 | Slepian |
|---|---|---|---|---|
| 3,141,071 | A | | 7/1964 | Rich |
| 3,164,686 | A | | 1/1965 | Tibbetts |
| 3,570,626 | A | | 3/1971 | Mochida et al. |
| 3,654,403 | A | | 4/1972 | Bobb |
| 3,674,946 | A | | 7/1972 | Winey |
| 3,919,499 | A | | 11/1975 | Winey |
| 4,032,725 | A | * | 6/1977 | McGee ...................... 381/395 |
| 4,037,061 | A | | 7/1977 | von Recklinghausen |
| 4,210,786 | A | | 7/1980 | Winey |
| 4,264,789 | A | | 4/1981 | Kaizu et al. |
| 4,281,223 | A | | 7/1981 | Ugaji et al. |
| 4,316,062 | A | | 2/1982 | Beveridge |
| 4,384,173 | A | | 5/1983 | Briefer et al. |
| 4,468,530 | A | | 8/1984 | Torgeson |

(Continued)

FOREIGN PATENT DOCUMENTS

FR    2 765 767    1/1999

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue University, West Lafayette, Indiana.

(Continued)

Primary Examiner—Huyen Le
(74) Attorney, Agent, or Firm—Pauley Petersen & Erickson

(57) ABSTRACT

A mounting bracket may be used to attach a device or component at a mounting location. The mounting bracket may comprise a an attachment portion having at least one tab portion that further comprises generally parallel first and second surfaces extending along a curved path. The tab portion may be designed so that the slot may be received at the mounting location so that, when installed, the first and second surfaces contact the interior and exterior surfaces, respectively. The tab portion, in cooperation with the slot, may accurately position and securely retain the mounting bracket at the mounting location.

43 Claims, 8 Drawing Sheets

U.S. PATENT DOCUMENTS

| | | |
|---|---|---|
| 4,471,172 A | 9/1984 | Winey |
| 4,471,173 A | 9/1984 | Winey |
| 4,480,155 A | 10/1984 | Winey |
| 4,484,037 A | 11/1984 | Nieuwendijk et al. |
| 4,536,623 A | 8/1985 | Larson |
| 4,544,805 A | 10/1985 | Sawafuji et al. |
| 4,584,439 A | 4/1986 | Paddock |
| 4,653,103 A | 3/1987 | Mori et al. |
| 4,703,510 A * | 10/1987 | Larson .................. 381/408 |
| 4,723,296 A | 2/1988 | Nieuwendijk et al. |
| 4,750,257 A | 6/1988 | Larson |
| 4,778,134 A * | 10/1988 | Struthers et al. .......... 248/27.1 |
| 4,803,733 A | 2/1989 | Carver et al. |
| 4,837,838 A | 6/1989 | Thigpen et al. |
| 4,924,504 A | 5/1990 | Burton |
| 4,939,784 A | 7/1990 | Bruney |
| 5,021,613 A | 6/1991 | Garcia |
| 5,148,493 A | 9/1992 | Bruney |
| 5,195,143 A | 3/1993 | Spiegel et al. |
| 5,283,836 A | 2/1994 | Trufitt |
| 5,297,214 A | 3/1994 | Bruney |
| 5,430,805 A | 7/1995 | Stevenson et al. |
| 5,627,903 A | 5/1997 | Porrazzo et al. |
| 5,764,595 A | 6/1998 | Power |
| 5,850,461 A | 12/1998 | Zelinka |
| 5,901,235 A | 5/1999 | Thigpen |
| 5,905,805 A | 5/1999 | Hansen |
| 5,953,438 A | 9/1999 | Stevenson et al. |
| 5,961,762 A | 10/1999 | Zelinka et al. |
| 6,008,714 A | 12/1999 | Okuda et al. |
| 6,097,830 A | 8/2000 | Zelinka et al. |
| 6,104,825 A | 8/2000 | Thigpen |
| 6,154,557 A | 11/2000 | Montour et al. |
| 6,185,310 B1 | 2/2001 | Kermani et al. |
| 6,546,106 B1 | 4/2003 | Azima |
| 6,845,166 B1 | 1/2005 | Hara et al. |
| 6,891,957 B1 * | 5/2005 | Manrique et al. ........... 381/386 |
| 2001/0009586 A1 | 7/2001 | Suzuki |
| 2001/0048256 A1 | 12/2001 | Miyazaki et al. |
| 2002/0191808 A1 | 12/2002 | Croft, III et al. |

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

EDM Charmilles; A Practical Guide to Electro-Discharge Machining; Ateliers des Charmilles S.A. (p. 12-13).

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5.. May 2004.

Five (5) pages of photographs of loudspeaker with mounting apparatus, undated.

Two (2) pages of photographs of bracket, undated.

* cited by examiner

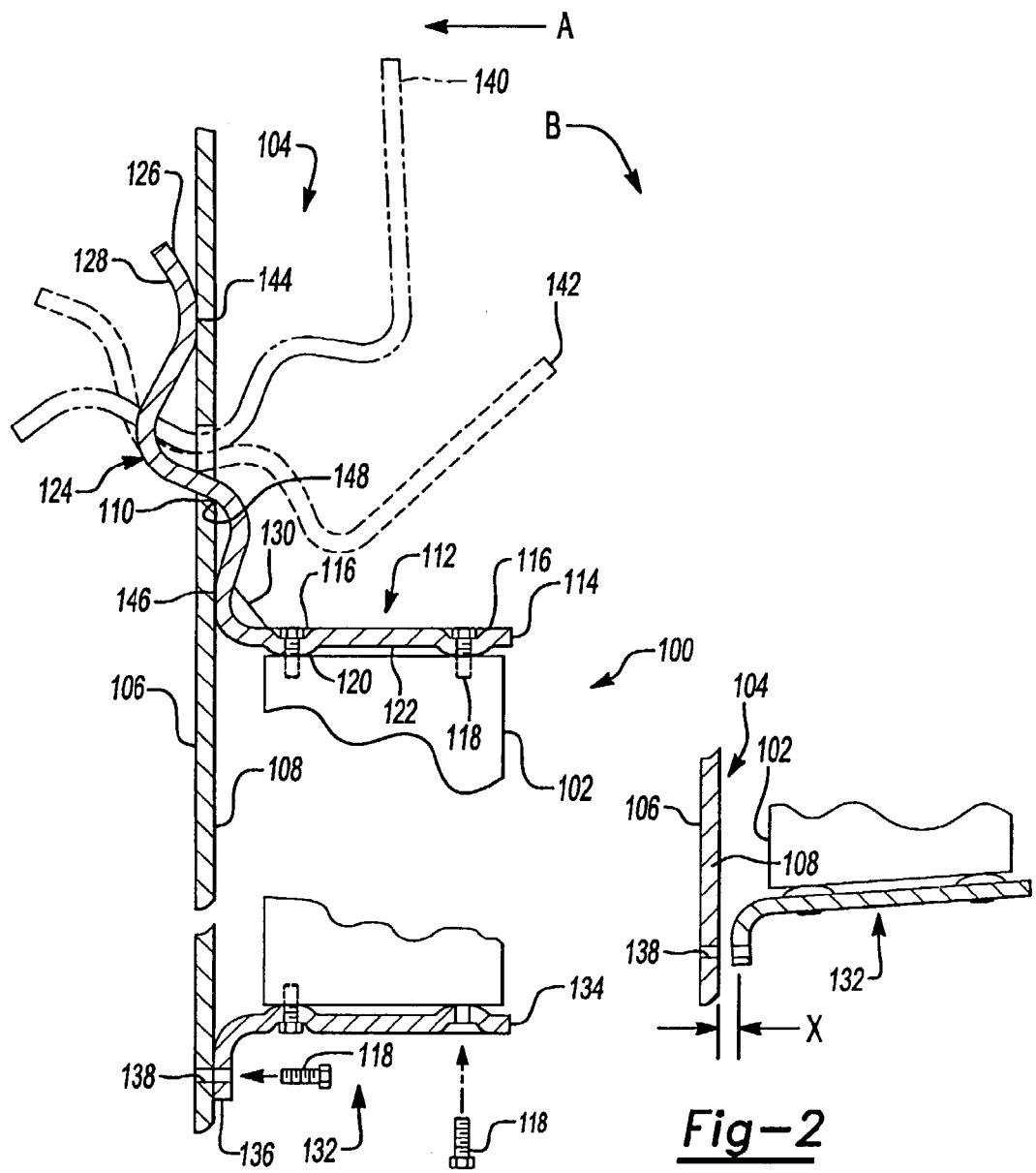

MOUNTING BRACKET SYSTEM

CROSS-REFERENCE TO RELATED APPLICATIONS

This application claims the benefit of U.S. Provisional Application No. 60/380,001, filed on May 2, 2002; U.S. Provisional Application No. 60/378,188, filed on May 6, 2002; and U.S. Provisional Application No. 60/391,134, filed on Jun. 24, 2002. The disclosures of the above applications are incorporated by reference.

This application incorporates by reference the disclosures of each of the following co-pending applications which have been filed concurrently with this application: U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/429,228, entitled "Electrical Connectors For Electro-Dynamic Loudspeakers," filed May 2, 2003; U.S. patent application Ser. No. 10/429,314, entitled "Electro-Dynamic Loudspeaker Mounting System," filed May 2, 2003; U.S. patent application Ser. No. 10/429,173, entitled "Conductors For Electro-Dynamic Loudspeakers," filed May 2, 2003; U.S. patent application Ser. No. 10/429,164, entitled. A method of assembling a loudspeaker; filed May 2, 2003; U.S. patent application Ser. No. 10/429,165, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; U.S. patent application Ser. No. 10/429,243, entitled "Frequency Response Enhancements For Electro-Dynamic Loudspeakers," filed May 2, 2003; and U.S. patent application Ser. No. 10/429,165, entitled "Magnet Arrangement For Loudspeaker," filed May 2, 2003.

BACKGROUND OF THE INVENTION

1. Field of Invention

This invention relates to mounting apparatus like brackets or hardware for mounting components and/or subassemblies at a variety of locations in a vehicle. In particular, the invention relates to a tab-type mounting bracket that is co-operable with a receiving slot in a mounting location.

2. Related Art

Mounting brackets and related fastener hardware are widely used to mount and secure components, such as audio and other components, including loudspeakers, amplifiers and the like, to sheet metal and other surfaces in an automobile. Such mounting apparatus commonly employ bracket hardware that is affixed to or integral with the component that is to be mounted, and a plurality of fasteners (often four or more) that pass through the bracket and are driven, screwed, or otherwise attached to the mounting location to secure the component.

However, a significant disadvantage of such mounting apparatus is that, during assembly-line installation, it requires an installer to accurately position and hold the component in place with one hand, while simultaneously, with the other hand, operating an installation tool, such as a power screw driver or wrench, to drive the fastener. A mounting bracket that eliminates the need for the assembly-line installer to position and hold the component during mounting would significantly simply the installation. Further, a need exists for a mounting bracket that requires fewer fasteners at installation of the component which would reduce the time required for installation.

SUMMARY

This invention provides a mounting bracket for use in attaching a device or component to a mounting location that includes a slot and interior and exterior mounting surfaces. The mounting bracket includes an attachment portion where the bracket is attached to a first end of the device or component by a fastener. The bracket may also include at least one tab portion having first and second surfaces that are generally parallel and extend along a curved path. The tab portion may be designed to be received in the slot of the mounting location so that, when installed, the first and second surfaces simultaneously contact the interior and exterior surfaces, respectively, at the mounting location. In this manner, the tab portion, in cooperation with the slot, accurately positions and securely retains the device at the mounting location.

The mounting bracket may also allow an assembly-line installer to accurately position the component to be mounted in place, yet have both hands free to operate an installation tool to further secure the installed component at the mounting surface. The mounting bracket enables the component to be positioned for installation in a variety of mounting configurations, including both horizontal and vertical orientations.

The tab portion of the mounting bracket can be adapted to resist vibrations, reducing the occurrence of squeaks, rattles, hums, etc. In addition, the tab portion of the mounting bracket may be designed to include a preload tension so that after installation the tab serves to rigidly attach the component to the mounting location at one end without the use of threaded fasteners or the like. Thus, the mounting bracket of the invention also reduces the number of fasteners that are necessary for component installation. Consequently, the mounting bracket of the invention reduces the amount of hardware and labor effort necessary during installation, ultimately reducing costs.

The bracket may also include a two-component construction of the mounting apparatus that attaches at opposite ends of the component to be mounted. The two-component mounting apparatus construction may also be integrally formed in a single component. The mounting bracket may be integrally formed or attached to an electro-dynamic loudspeaker.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being place upon illustrating the principles of the invention. Moreover, in the figures, like reference numerals designate corresponding parts throughout the different views.

FIG. 1 is a cross-sectional side view showing the mounting bracket.

FIG. 2 is a partial cross-sectional side view showing an alternate arrangement for the mounting bracket.

DETAILED DESCRIPTION

Figure 3:
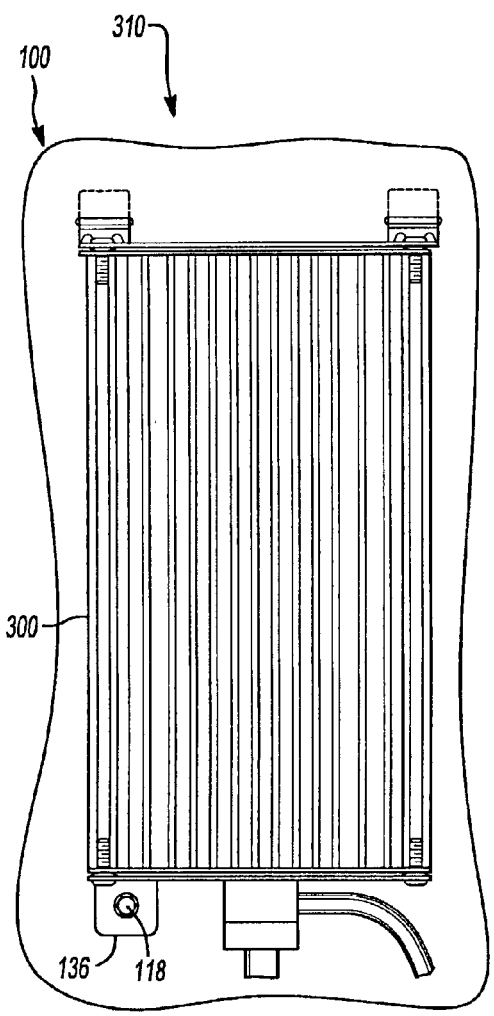
FIG. 3 is a front view illustrating the mounting bracket of the invention as utilized for the installation of a audio component at a mounting location in a vehicle.
Figure 4:
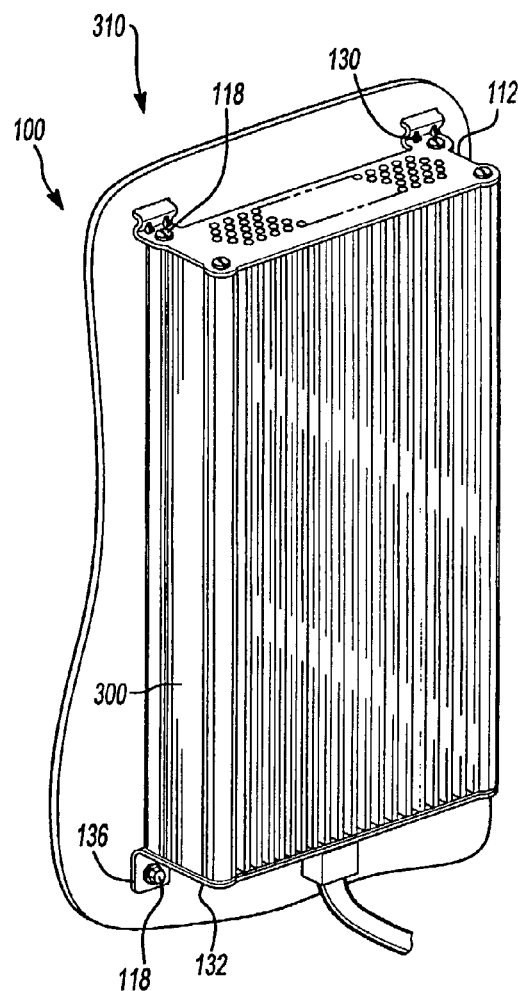
FIG. 4 is a three-quarter top perspective view of the mounting bracket shown in FIG. 3.
Figure 5:
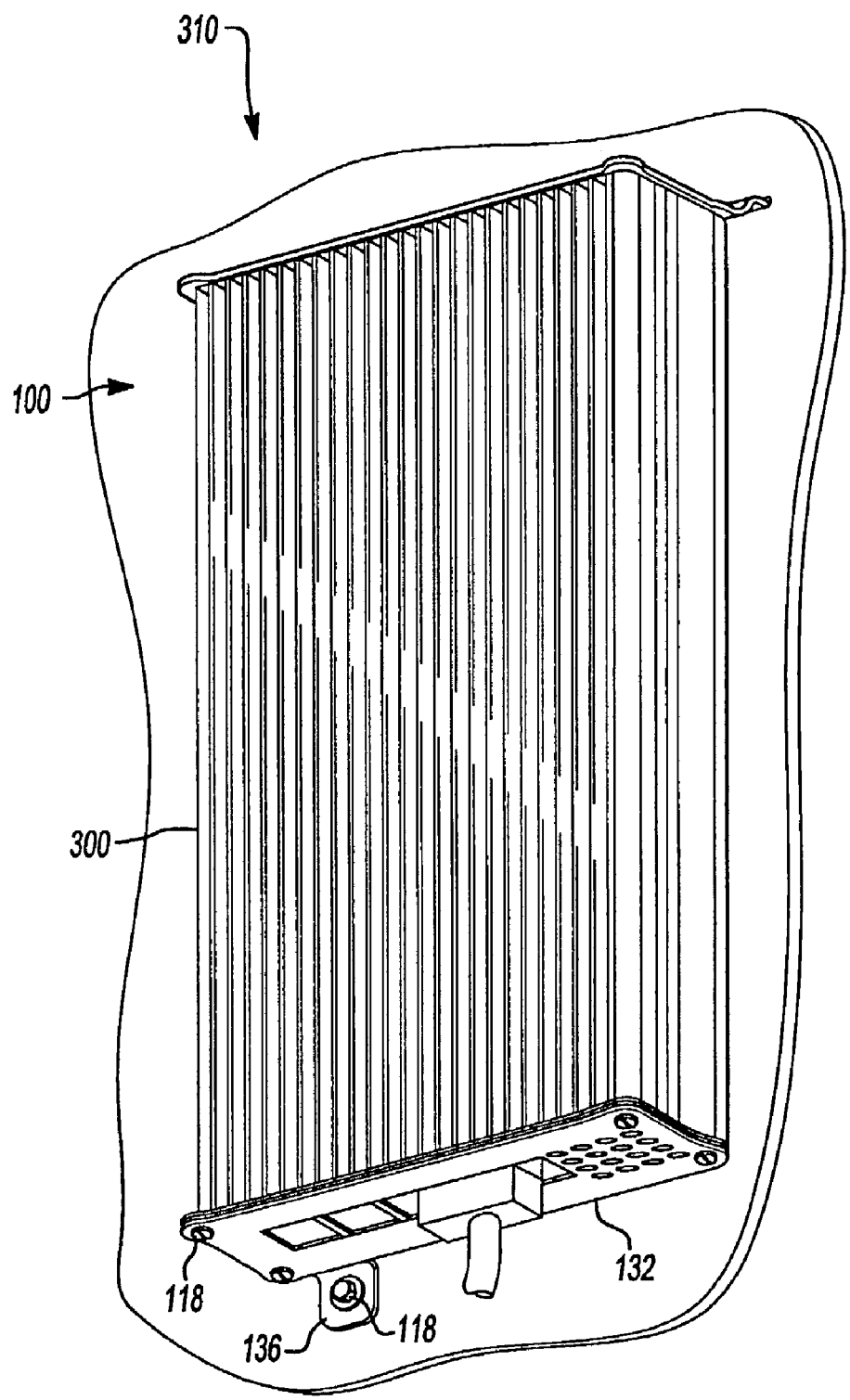
FIG. 5 is a three-quarter bottom perspective view of the mounting bracket shown in FIG. 3.

FIGS. 1–5 illustrate the mounting bracket 100 used to mount and secure subassemblies and/or electronic components 102, such as audio, computer or vehicle control components, in a vehicle assembly line installation operation. In FIGS. 3–5, an audio power amplifier 300 is illustrated with the mounting bracket 100. The amplifier 300 is installed in a vertical structural pillar of a vehicle. The structural pillar provides a mounting location 310 where the mounting bracket 100 is attached. The mounting bracket 100 may be adapted to mount and secure any of a variety of components or sub-assemblies in any of a variety of desired locations in the vehicle.

Referring to FIG. 1, the mounting location 104 is illustrated as one of the structural pillars of a vehicle typically constructed of sheet metal. The mounting location 104 includes an interior surface 106 and an exterior surface 108. One or more holes or slots 110 are included in the mounting location 104 and cooperates with the mounting apparatus 100. The slot 110 is sized and positioned within the mounting location 104 to ensure that the mounting bracket 100 accurately locates the component 102 being installed in the desired position in the vehicle.

The mounting bracket 112 has a component attachment portion 114 that includes a plurality of holes or apertures 116 through which any of a variety of fasteners 118 may be utilized to attach the component 102 to the mounting bracket 112. Raised portions or bosses 120 that are integral with the mounting bracket 112 may be included adjacent the apertures 116 on the inner surface 122 of the component attachment portion 114 to set off and substantially isolate the component 102 from the remainder of the mounting bracket 112. In a typical assembly sequence, the mounting bracket 112 is attached to the component 102 in a pre-assembly procedure that is completed as a sub-assembly prior to the assembly-line installation of the component 102 in the vehicle.

An alternate methodology of fastening the mounting bracket 112 to the component 102 may also be employed, such as by interlocking "snap-fit"-type connector assemblies (not shown). For example, such an interlocking connector assembly could include mating male and female sections (e.g., a "Christmas tree" connector) that are integral to each of the mounting bracket 112 component attachment portion 114 and component 102. Attaching the mounting bracket 112 to the component 102 would then simply require snapping the two parts together. Another fastening means could include a hook and loop fastener, like Velcro®, that is adhered by an adhesive to each of the mounting bracket 112 component attachment portion 114 and the component 102. Any fastening device should be suited to the requirements and circumstances where the mounting bracket 100 is to be utilized (e.g., size and weight of the component, performance requirements of the component, or operating conditions seen by the component). Preferably, any fastening scheme would serve to minimize or eliminate the transmission of vibrations to, or the generation of squeaks, rattles, or hums from, the mounting bracket 100 or component 102.

The mounting bracket 112 also has at least one tab portion 124. The tab portion 124 is shown to include generally parallel, first and second surfaces 126, 128 that wind along a curved path to create a S-type configuration. The number and size of the tab portion(s) 124 (e.g., width, thickness, length and particular curvature of the tab portion 124) may be determined based upon the configuration, size, and weight of the component 102 to be mounted, and any other pertinent requirements of the application for the mounting apparatus' 100 use.

The tab portion 124 of the mounting bracket 112 is received in the slot 110 provided at the mounting location 104. Upon installation, the tab portion's 124 first and second surfaces 126, 128 contact the interior and exterior surfaces 106, 108, respectively, at the mounting location 104. In addition to being located to ensure that the mounting apparatus 100 accurately positions the component 102 for installation, as already discussed, the slot 104 is sized to be operable to both receive the tab portion 124 during the installation procedure and securely retain the tab portion 124 once installation of the mounting bracket 112 is complete.

One or more gussets or ribs 130 may also be included in the mounting bracket 112, as shown in the Figures. Such rib(s) 130 could be located between the component attachment portion 114 and the tab portion 124 of the mounting bracket 112. The ribs 130 could provide additional structural integrity to the mounting bracket 112 to prevent undesirable flexing or deformation in the mounting bracket 112 caused by things like the weight of the component 102 or the operating conditions seen by the mounting bracket 112 during use of the vehicle.

In an alternate configuration of the invention, a second mounting bracket 132 may also be included for pre-assembly at the opposite end of the component 102 to be mounted from that of the mounting bracket 112. Like the mounting bracket 112 described above, the second mounting bracket 132 also includes a component attachment portion 134. The second mounting bracket 132 may be attached to the component 102 in a manner like that discussed above. In addition, the second mounting bracket 132 can include one or more flanges 136 that extend from the component attachment portion 134 in a direction generally parallel to the exterior surface 106 of the mounting location 104.

Upon installation of the component 102, the second mounting bracket 134 is attached to the mounting location 104 at the flange(s) 136, to fixedly secure the component in place. Attachment of the second mounting bracket 132 to the mounting location 104 may be made through engagement of aperture 138 by threaded fastener 118 or any one of a variety of other well-known attachment mechanisms, including those already discussed herein. Of course, the number and size of the flange(s) 136 may be determined, as with the tab portion(s) 124 by things like the weight of the component 102 or the operating conditions experienced by the mounting apparatus 100 and component 102 in use.

Installation of the mounting apparatus 100 is accomplished by inserting the tab portion 124 of the mounting bracket 112 through the receiving slot 110 at the mounting location 104, illustrated generally at 140 and at arrow A in FIG. 1. The tab portion 124 is thus passed through the slot 110 in a direction generally perpendicular to the exterior surface 106 of the mounting location 104, such that the tab portion 124 is inserted into the mounting location 104 until the first surface 126 of the tab portion 124 abuts the exterior surface 108 at the mounting location 104. The mounting bracket 112 is then rotated (as shown in the Figures) in the direction of arrow B. The tab portion 124 of the mounting bracket 112 may then be worked further into the slot 110 and rotated in a manner such as that shown generally at 142 in FIG. 1. Further rotation of the mounting bracket 112 in the direction of arrow B terminates when the first surface 126 of the mounting bracket 112 tab portion 124 abuts the interior surface 106 at the mounting location 104 and, simultaneously, the second surface 128 of the mounting bracket 112 tab portion 124 abuts the exterior surface 108 at the mounting location 104.

At this point in the installation, the component 102 is secured at the mounting location 104 (which, in FIG. 1, is shown to be generally vertically oriented) by the mounting bracket 112 at three points of contact shown at locations 144, 146, and 148. If necessary or desired, conventional fasteners, such as threaded fasteners, may also be utilized with the mounting bracket 112 to further secure the component 102 at the mounting location 104. Likewise, the second mounting bracket 132 may also be used.

As is readily apparent based upon the foregoing, an assembly-line installer has both hands free to operate an installation tool to drive such fasteners because the component 102 is fully secured at the mounting location 104 by the mounting bracket 112. Thus, a significant advantage of the mounting apparatus 100 of the invention is that the component 102 may be hung or set in its proper installation position, and maintained in that position without the aid of the assembly-line installer. Consequently, the assembly-line installer may manipulate an installation tool such as a power drill/driver, wrench, or other tool, with both hands.

Of course a similar installation may be accomplished with a mounting location 104 at orientations other than vertical, provided that the weight of the component 102 to be installed initiates the contact of at least the first and second surfaces 126, 128 of the tab portion 124 with the mounting surfaces 106, 108.

When used in conjunction with a second mounting bracket 132, the mounting apparatus 100 may be designed to provide for a pre-tensioned installation at the tab portion 124. In this regard, when the second mounting bracket 132 is secured to the mounting location 104, the tab portion 124 of the mounting bracket 112 is held in positive contact against the interior 106 and exterior 108 surfaces at the mounting location 104 and the slot 110 in the 3-point contact 144, 146, 148 described above. The positive contact is made by a force generated in reaction to a force resulting from the fastening the second mounting bracket 132 to the mounting location 104.

With the tab portion 124 of the mounting bracket 112 seated in the slot 110, the mounting bracket 112 may be designed so as to angle the component 102 away from the exterior surface 106 at the mounting location 104, causing the end of the component 102 and bracket 132 to be a distance X from the exterior surface 108. Thus, prior to securing the second mounting bracket 132 at the mounting location 104, the component 102 remains free at one end, and the second bracket 132 is a distance X away from the exterior surface 108 of mounting location 104. Upon securing the second mounting bracket 132 to the mounting location 104, the mounting bracket 112 is thus placed under a load, and the first and second surfaces 126, 128 of the tab portion 124 are forced against the interior and exterior surfaces 106, 108 at the mounting location 104, as shown at 144, 146 in FIG. 1.

The mounting apparatus 100 of the invention incorporating similar features of mounting brackets 112 and 132 may also be manufactured as a unitary construction (as discussed below). Of course, the mounting apparatus 100 must be constructed of a material that possesses the strength suitable to ensure that, upon installation, the component 102 is securely fixed at the mounting location 104 and will continue to maintain a secure mount and withstand the operating conditions experienced by the vehicle.

One contemplated method of manufacture for the mounting bracket 112, 132 is as a one-piece metal stamping. Such a mounting bracket 112, 132 would be cost effective to manufacture in high production volumes and easily meet all of the mounting apparatus' performance requirements.

A metal mounting bracket 112, 132 may also be coated with a plastic material to provide additional desirable characteristics in the mounting bracket 112, 132. One method contemplated for plastic coating a metal mounting bracket 112, 132 is by dip coating. In addition to providing the necessary strength, a plastic-coated metal mounting bracket 112, 132 could provide improved damping characteristics that would reduce the transmission of vibrations to or from the component 102. Also, squeaks, rattles and/or hums that are often associated with metal-to-metal contacts can be eliminated or reduced with a plastic-coated metal mounting bracket 112, 132.

Another characteristic that may be achieved by plastic coating is to increase the coefficient of friction of the first and second surfaces 126, 128 of the tab portion 124 of the mounting bracket 112. The increased friction coefficient would reduce any tendency toward sliding movement of the mounting bracket 112 relative to the interior and exterior surfaces 106, 108 at the mounting location 104.

Also, plastic coating a metal mounting bracket 112, 132 may provide for or enhance the "handle-ability" of the component and or the mounting bracket sub-assembly for the worker that installing the component on the automobile assembly line. A plastic coating would minimize the presence of any sharp edges, such as may be inherent to a metal stamped part.

Alternatively, the mounting bracket 112, 132 may be molded in one piece from plastic, such as by plastic injection molding or otherwise. There are a variety of suitable, low-cost plastic materials that may be utilized for such an application that possess both the required structural characteristics as well as the additional features discussed above.

Figure 6:
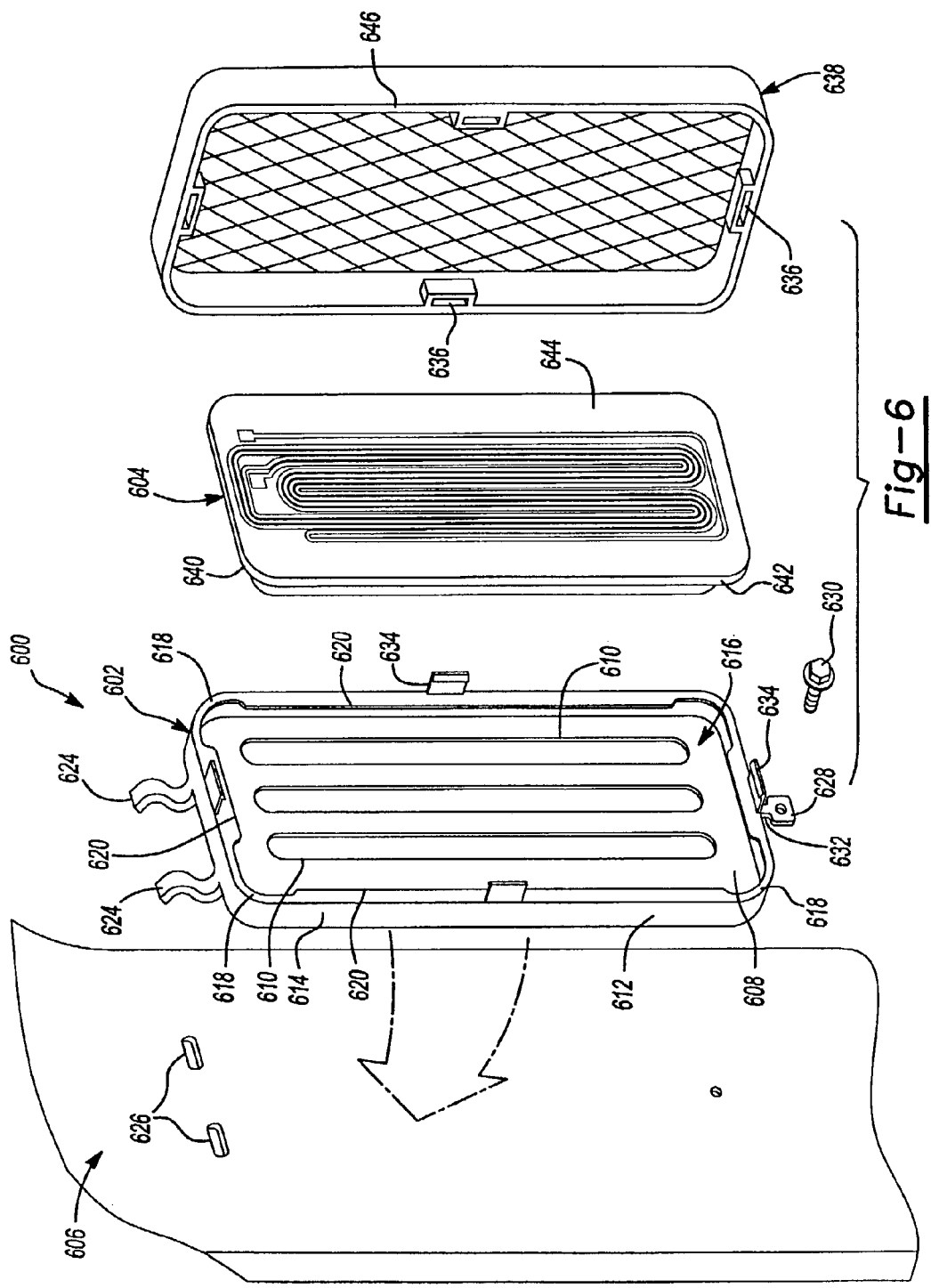
FIG. 6 is an exploded three-quarter side perspective view illustrating the mounting bracket of an alternative embodiment as utilized for the installation of an electro-dynamic loudspeaker at a mounting location in a vehicle.

Another embodiment of the invention is illustrated in FIG. 6. As previously mentioned and as shown in FIG. 6, the mounting apparatus 600 may comprise a mounting bracket 602 of unitary construction. The mounting bracket 602 is shown in the figure for installation of a loudspeaker 604 on the mounting surface 606, such as a structural pillar in an automobile.

The mounting bracket 602 is shown to include a generally planar, back panel section 608. Optionally, a plurality of apertures 610 may be included in the back panel section 608 to, for example, reduce the cost and/or weight of the mounting bracket 602 or provide air passageways through the mounting bracket 602, as necessary.

A sidewall 612 extends generally orthogonally from the back panel section 608 so as to define the outer boundary or periphery 614 and the interior space 616 of the mounting bracket 602. Extending inwardly from the periphery 614 of the sidewall 612 and toward the interior 616 of the mounting bracket 602, is a flange or rib 618. The rib 618 generally lies in a plane that is parallel to and offset from the back panel section 608, thereby establishing the thickness of the mounting bracket 602. Portions 620 of the rib 618 may extend still further inwardly from the sidewall 612, as shown at locations 620.

Similar to that shown and described above, the mounting bracket 602 also includes at least one S-shaped tab portion 624 that extends from the back panel section 608 at one end of the mounting bracket 602. The tab portion(s) 624 engages and secures the mounting bracket 602 at a slot(s) 626 at the mounting location 606, in a manner as already discussed. Located on an opposite end of the mounting bracket 602 is a flange 628. The flange 628 provides a location at which the mounting bracket 602 may be secured to the mounting location 606, such as via a threaded fastener 630 or as otherwise well-known or disclosed herein. The flange 628 may further include a neck portion 632 that allows the position and/or orientation of the flange 628 to be manipulated, such as by bending or twisting, to better conform to the surface at the mounting location 606. As with the other embodiments of the invention discussed above, the number and location of the tab portion(s) 624 and flange(s) 628 may be determined by the requirements of the mounting application, such as the size, shape and weight of, and the operating conditions seen by, the device that is to be mounted or the space available at the mounting location 606.

Also integrally included as part of the mounting bracket 602 are a plurality of male projections 634 extending outwardly from the rib 618 of the mounting bracket 602. Each of the projections 634 forms one-half of a two-piece snap-fit-type fastener. The projections 634 may be included for interlocking with corresponding female receptacles 636 that are part of a finish trim piece 638, like a bezel or cover, so that the finish trim piece 638 may be easily connected directly to the mounting bracket 602 to complete a component's installation. Any of a variety of suitable interlocking connections may be included in the mounting bracket 602.

The mounting bracket 602 is shown in FIG. 6 to be generally rectangular in shape. The mounting bracket 602 may, of course, be of any shape, size and configuration that is suitable to accommodate the particular device that is to be mounted.

As shown in FIG. 6, a loudspeaker 604 may be mounted in, for example, an automobile, with the mounting bracket 602 of the invention. The loudspeaker 604 generally includes a dish-shaped frame 640 with an outwardly extending flange 642. A thin-film diaphragm 644 is attached to the flange 642, under tension, to provide a moveable membrane capable of producing sound.

Installation of the loudspeaker 604 via the mounting bracket 602 is accomplished by assembling the loudspeaker 604 with the mounting bracket 602, which is installed at the mounting location 606 in a manner like that already described above. Preferably, the loudspeaker 604 is attached to the mounting bracket 602 prior to installing the mounting bracket 602 at the mounting location 606. Alternatively, the mounting bracket 602 may first be installed at the mounting location 606, and the loudspeaker 604 subsequently be assembled with the mounting bracket 602.

The loudspeaker 604 is retained within the interior space 616 of the mounting bracket 602 between the back panel section 608 and the inwardly extending rib portions 620 that overlay a peripheral portion or rim of the flange 642 on the loudspeaker's 604 frame 640. In this configuration, the depth of the interior space 616 of the mounting bracket 602 closely matches the thickness of the loudspeaker 604 so that the mounting bracket 602 adequately secures the loudspeaker 604. Optionally, the loudspeaker 604 may be secured directly to the back panel section 608 of the mounting bracket 602, such as through the use of an adhesive or by a hook and loop fastener, like Velcro®, that is adhered by an adhesive to the back panel section 608 and the back of the loudspeaker 604.

A trim piece 638, in this case, for example, a speaker grille, may then be attached to the mounting bracket 602. The grille 638 is secured to the mounting bracket 602 by the interlocking of the female receptacles 636 located about its periphery 646 with the corresponding male projections 634 extending outwardly from the rib 618 of the mounting bracket 602. Thus, the mounting bracket 602 facilitates the finished installation of the loudspeaker 604 with an aesthetically pleasing appearance.

Figure 7:
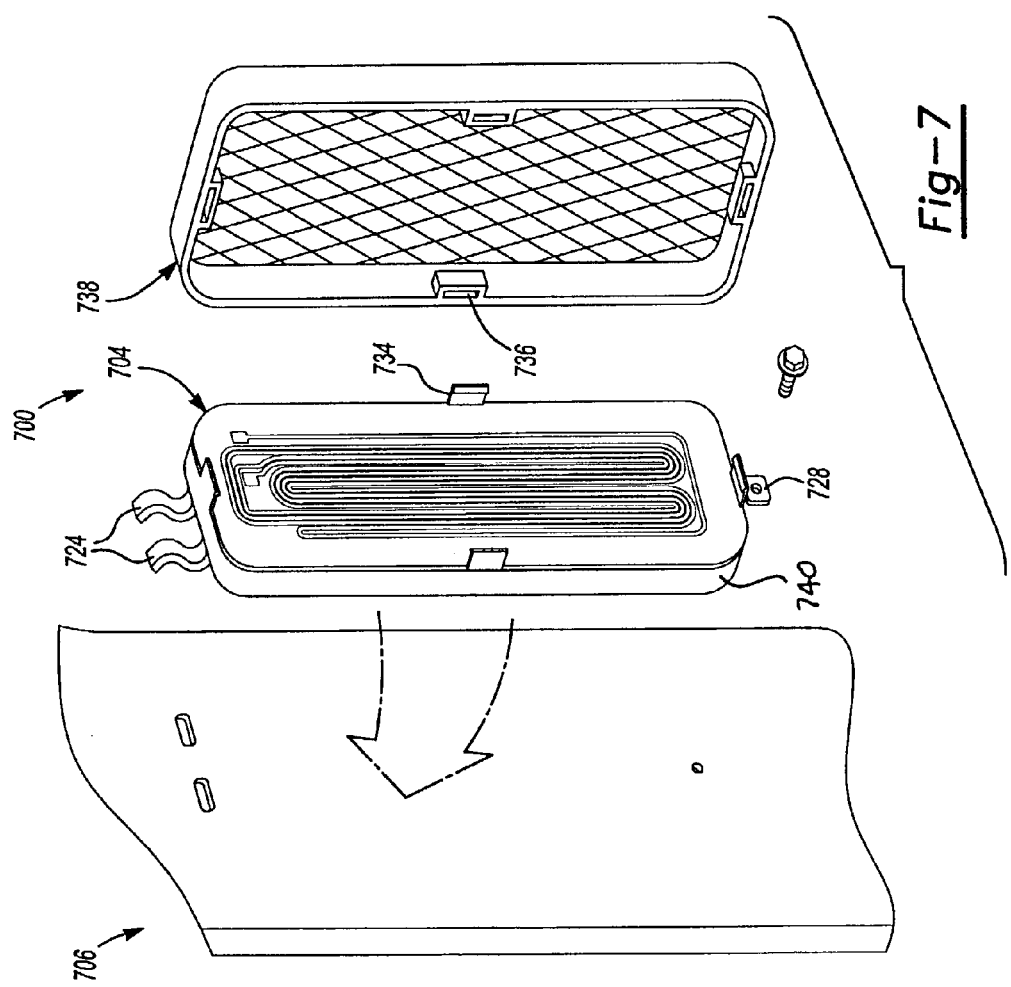
FIG. 7 is an exploded three-quarter side perspective view illustrating the mounting bracket of an alternative embodiment as incorporated into the structure of an electro-dynamic loudspeaker audio component for mounting the component at a mounting location in a vehicle.
Figure 8:
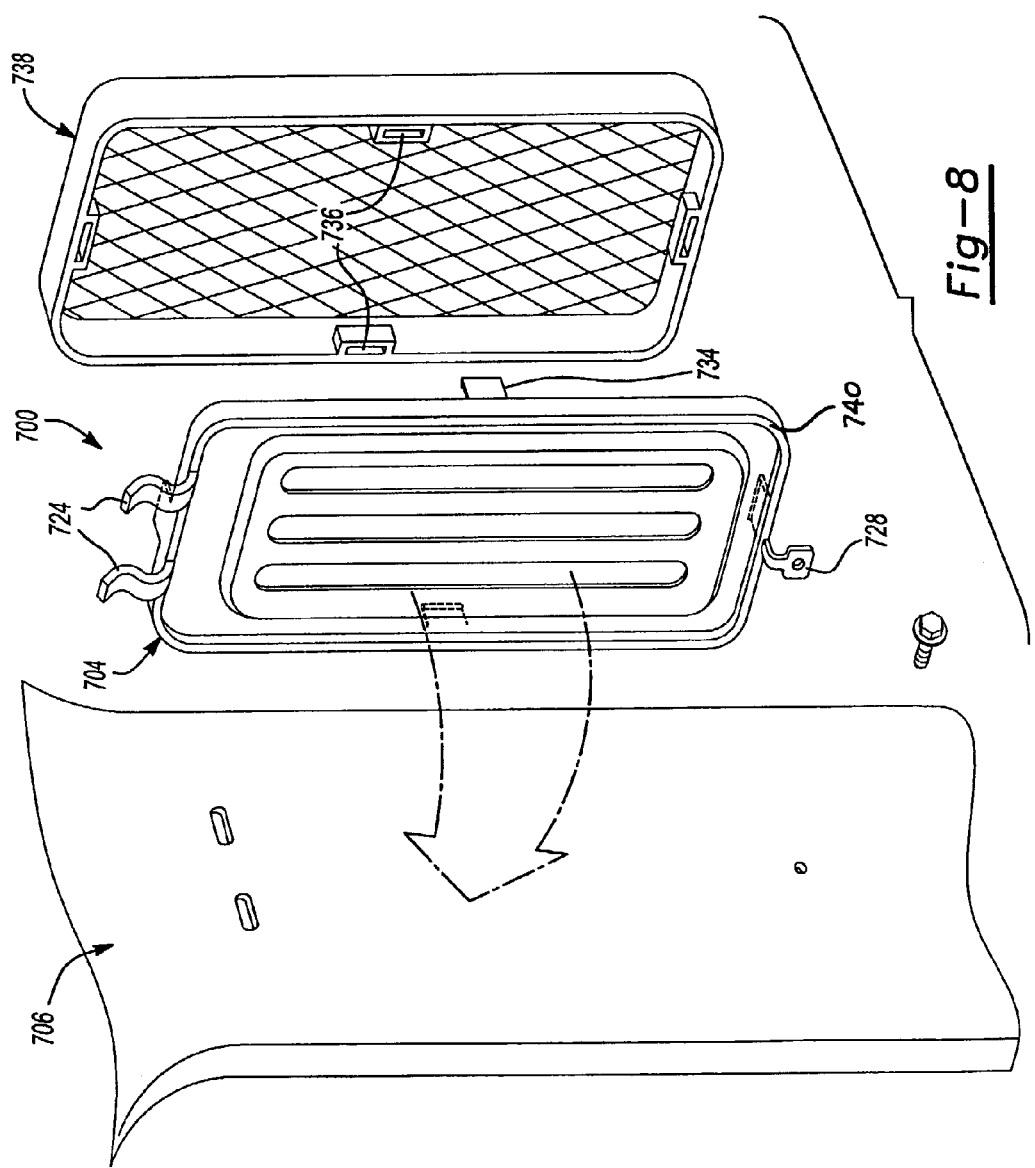
FIG. 8 is an exploded three-quarter back view illustrating the alternative embodiment illustrated in FIG. 7.

FIGS. 7 and 8 illustrate another embodiment of the invention 700 that is similar to the embodiment shown in FIG. 6. In this alternative embodiment, however, the frame 740 of the loudspeaker 704, itself, incorporates mounting bracket features to enable the loudspeaker 704 to be mounted directly at the mounting location 706. In this regard, the loudspeaker 704 includes one or more S-shaped tab portion(s) 724 and one or more flange(s) 728. In addition, the frame 740 may incorporate one or more snap-fit-type connectors 734 that can be matingly received in corresponding female receptacles 736 in a finish trim grille 738. As discussed above, installing the loudspeaker 704 at the mounting location 706 is simple, fast, and economical. One obvious additional advantage is the elimination from the construction of the invention of a separate and distinct mounting bracket component. Hence, the configuration of the invention 700 that is shown in FIGS. 7 and 8 reduces the number of components in a finished installation, thereby creating the potential for even a greater reduction in cost and labor.

Figure 9:
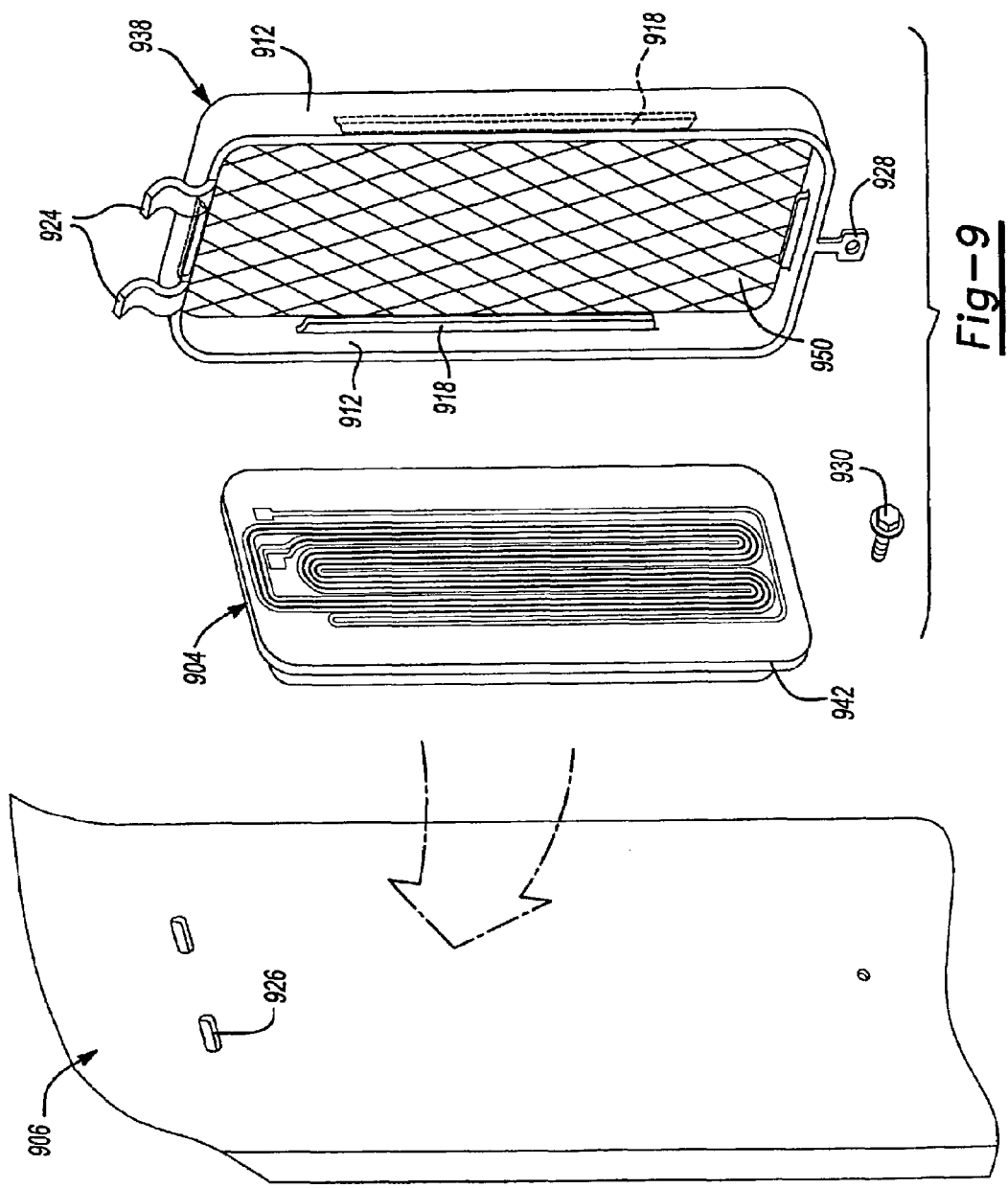
FIG. 9 is an exploded three-quarter side perspective view illustrating the mounting bracket of another embodiment for the installation of an electro-dynamic loudspeaker audio component at a mounting location in a vehicle.
Figure 10:
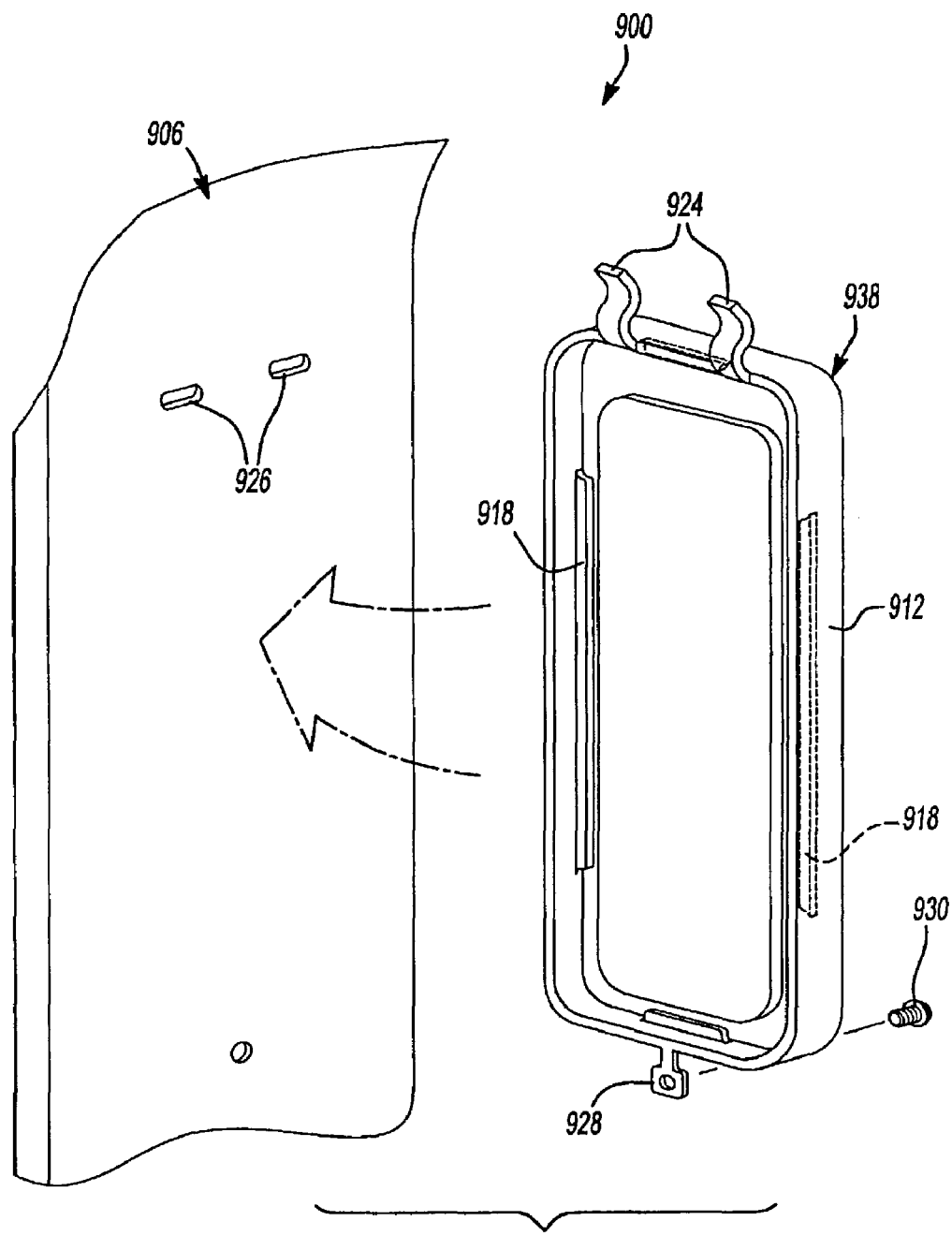
FIG. 10 is a three-quarter back view illustrating an alternative embodiment illustrated in FIG. 9.

FIGS. 9 and 10 show still another alternate embodiment of the invention 900. Here, it is the grille 938 (and not the loudspeaker 904) that incorporates the features of a mounting bracket that enable the loudspeaker 904 to be mounted while minimizing the number of components in the invention 900. As illustrated, the trim cover 938 (e.g., a speaker grille) includes one or more S-shaped tab portion(s) 924 and one or more flange(s) 928 that allow the grille 938 to be directly installed at the mounting location 906.

Included in two or more sidewalls 912 of the grille 938, at locations intermediate the opposite ends of the sidewalls 912, are elongated ribs 918 that project toward the interior of the grille 938. The configuration of the elongated ribs 918 enable the loudspeaker 904 to be secured within grille 938 at the rim of the flange 942 of the loudspeaker's frame 940, between the ribs 918 and the front face 950 of the grille 938 (see FIG. 10). The grille 938 may then be secured at the mounting location 906 through the interaction between tab portions 924 and the slots 926 in the mounting location 906, and further, by securing the flange 928 to the mounting location 906, such as with a threaded fastener 930. Again, elimination of a separate mounting bracket is achieved, thereby enabling a simpler, faster, and more economical installation of the loudspeaker.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A mounting apparatus for use in installing an audio device in a vehicle, comprising:
    a mounting location comprising a slot and interior and exterior mounting surfaces; and
    a mounting bracket where the mounting bracket comprising:
        a component attachment portion for attaching the mounting bracket to a first end of the device;
        a fastener for attaching the device to the mounting bracket at the component attachment portion;
        at least one tab portion comprising first and second surfaces, the first and second surfaces being generally parallel and extending along a curved path, the tab portion capable of being received within the slot of the mounting location such that the first surface contacts the interior surface of the mounting location and the second surface contacts the exterior surface of the mounting location;
        the tab portion capable of being operative to cooperate with the slot to accurately position and securely retain the device at the mounting location.

2. The mounting apparatus of claim 1 further comprising a second mounting bracket where the second mounting bracket comprises:
    a second component attachment portion for attaching the mounting bracket to a second end of the device;
    a first fastener that attaches the device to the second mounting bracket at the component attachment portion; and
    a flange that extends from the component attachment portion in a direction generally parallel to the exterior surface of the mounting location; and
    a second fastener that attaches the second bracket to the mounting location.

3. The mounting apparatus of claim 2, where the flange further comprises a neck portion that allows the orientation of the flange to be manipulated to conform to the exterior surface of the mounting location.

4. The mounting apparatus of claim 2, where the first and second surfaces of the at least one tab portion comprise a means for increasing the coefficient of friction of the first and second surfaces.

5. The mounting apparatus of claim 2, where the first and second surfaces of the at least one tab portion comprise a means for increasing the damping characteristics of the first and second surfaces.

6. The mounting apparatus of claim 2, where the mounting bracket and the second mounting bracket is integrally molded in a single piece from plastic.

7. The mounting apparatus of claim 2, further comprising an adhesive for attaching the first component attachment portion to the first end of the audio device.

8. The mounting apparatus of claim 2, further comprising a hook and loop fastener for attaching the first component attachment portion to the first end of the audio device.

9. The mounting apparatus of claim 2, further comprising at least one threaded fastener for attaching the first component attachment portion to the first end of the audio device.

10. The mounting apparatus of claim 2, further comprising an adhesive for attaching the second component attachment portion to the second end of the audio device.

11. The mounting apparatus of claim 2, further comprising a hook and loop fastener for attaching the second component attachment portion to the second end of the audio device.

12. The mounting apparatus of claim 2, further comprising at least one threaded fastener for attaching the second component attachment portion to the second end of the audio device.

13. The mounting apparatus of claim 2 where the mounting bracket further comprises at least one gusset spanning the component attachment portion and the tab portion.

14. The mounting apparatus of claim 2, where the mounting bracket comprises a plurality of tab portions.

15. The mounting apparatus of claim 2, where the mounting location further comprises a structural pillar of a vehicle.

16. An audio component installation comprising:
    a mounting location in a vehicle comprising a slot and interior and exterior mounting surfaces;
    an audio amplifier; and
    a mounting apparatus comprising:
    a first component attachment portion;
    means for attaching a first end of the audio amplifier to the first component attachment portion;
    at least one tab portion comprising first and second surfaces, the first and second surfaces being generally parallel and extending along a curved path, the tab portion being received within the slot of the mounting location such that, simultaneously, the first surface contacts the interior surface of the mounting location and the second surface contacts the exterior surface of the mounting location, the tab portion cooperable with the slot to accurately position and securely retain the device at the mounting location;
    a second component attachment portion;
    means for attaching a second end of the audio amplifier to the second component attachment portion;
    a flange extending from the second component attachment portion in a direction generally parallel to the exterior surface of the mounting location; and
    a fastener for attaching the flange to the mounting location.

17. The installation of claim 16 where the mounting apparatus further comprises at least one gusset spanning the first component attachment portion and the at least one tab portion.

18. The installation of claim 16, where the flange further comprises a neck portion that allows the orientation of the flange to be manipulated to conform to the exterior surface of the mounting location.

19. The installation of claim 16, where the first and second surfaces of the at least one tab portion comprises a means for increasing the coefficient of friction of the first and second surfaces.

20. The installation of claim 16, where the first and second surfaces of the at least one tab portion comprises a means for increasing the damping characteristics of the first and second surfaces.

21. The installation of claim 16, where mounting apparatus is integrally molded in a single piece from plastic.

22. The installation of claim 16, where the mounting apparatus comprises a plurality of tab portions.

23. The installation of claim 16, where the mounting location further comprises a structural pillar of a vehicle.

24. The installation of claim 16, where the means for attaching a first end of the audio amplifier to the first component attachment portion comprises an adhesive.

25. The installation of claim 24, where the means for attaching a second end of the audio amplifier to the second component attachment portion comprises an adhesive.

26. The installation of claim 16, where the means for attaching a first end of the audio amplifier to the first component attachment portion comprises a hook and loop fastener.

27. The installation of claim 26, where the means for attaching a second end of the audio amplifier to the second component attachment portion a hook and loop fastener.

28. The installation of claim 16, where the means for attaching a first end of the audio amplifier to the first component attachment portion comprises at least one threaded fastener.

29. The installation of claim 28, where the means for attaching a second end of the audio amplifier to the second component attachment portion comprises at least one threaded fastener.

30. An audio component installation comprising:
   a mounting location in a vehicle comprising a slot and interior and exterior mounting surfaces;
   an electro-dynamic loudspeaker comprising a flat panel loudspeaker; and
   a mounting apparatus comprising:
   a mounting bracket comprising at least one tab portion comprising first and second surfaces, the first and second surfaces being generally parallel and extending along a curved path, the tab portion being received within the slot of the mounting location such that the first surface contacts the interior surface of the mounting location and the second surface contacts the exterior surface of the mounting location; and a flange that extends in a direction generally parallel to the exterior surface of the mounting location; and
   means for attaching the electro-dynamic loudspeaker to the mounting bracket.

31. The installation of claim 30, where the mounting bracket further comprises at least one gusset adjacent to the at least one tab portion.

32. The installation of claim 30, where the flange further comprises a neck portion that allows the orientation of the flange to be manipulated to conform to the exterior surface of the mounting location.

33. The installation of claim 30, where the first and second surfaces of the at least one tab portion comprise means for increasing the coefficient of friction of the surfaces.

34. The installation of claim 30, where the first and second surfaces of the at least one tab portion comprises a means for increasing the damping characteristics of the surfaces.

35. The installation of claim 30, where the mounting bracket is integrally molded in a single piece from plastic.

36. The installation of claim 30, where the means for attaching the electro-dynamic loudspeaker to the mounting bracket comprises an adhesive.

37. The installation of claim 30, where the means for attaching the electro-dynamic loudspeaker to the mounting bracket comprises a hook and loop fastener.

38. The installation of claim 30, where the mounting bracket further comprises a first component attachment portion and a second component attachment portion; and
   the means for attaching the electro-dynamic loudspeaker to the mounting bracket comprises a first fastener and a second fastener.

39. The installation of claim 30, where the mounting bracket further comprises:
   a generally planar back panel;
   a sidewall extending from the back panel so as to define an interior space of the mounting bracket; and where the means for attaching the electro-dynamic loudspeaker to the mounting bracket comprises a rib extending from the sidewall inwardly toward the interior space, the rib lying in a plane generally parallel to and offset from the back panel, the rib operative to retain the electro-dynamic loudspeaker within the interior space.

40. The installation of claim 39, where the back panel comprises a plurality of apertures.

41. The installation of claim 30, where the mounting bracket comprises a plurality of tab portions.

42. The installation of claim 30, where the mounting location further comprises a structural pillar of a vehicle.

43. The installation of claim 30, further comprising a grille cover; and where
   the mounting bracket further comprises means for connecting the grille cover to the mounting bracket.

* * * * *